US012663071B2

(12) United States Patent
Bernklau et al.

(10) Patent No.: US 12,663,071 B2
(45) Date of Patent: Jun. 23, 2026

(54) REMOTE GEARBOX LUBRICANT LEVEL GAUGE SYSTEM FOR ROTORCRAFT

(71) Applicant: Textron Innovations Inc., Providence, RI (US)

(72) Inventors: Nathaniel Ross Bernklau, Keller, TX (US); Charles Eric Covington, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/316,073

(22) Filed: May 11, 2023

(65) Prior Publication Data

US 2024/0376976 A1 Nov. 14, 2024

(51) Int. Cl.
    *F16H 57/04* (2010.01)
    *F16N 29/00* (2006.01)
    *G01F 23/292* (2006.01)
    *F16H 57/02* (2012.01)

(52) U.S. Cl.
    CPC ......... *F16H 57/0449* (2013.01); *F16N 29/00* (2013.01); *G01F 23/2924* (2013.01); *F16H 2057/02043* (2013.01); *F16N 2210/08* (2013.01); *F16N 2210/12* (2013.01); *F16N 2250/18* (2013.01)

(58) Field of Classification Search
    CPC ... G01F 23/2924; F16N 29/00; F16H 57/0449
    See application file for complete search history.

(56) References Cited

U.S. PATENT DOCUMENTS

| | | | | |
|---|---|---|---|---|
| 3,120,125 A * | 2/1964 | Vasel | ................. | G01F 23/2927 |
| | | | | 73/290 R |
| 3,466,928 A * | 9/1969 | Kind | ................... | G01F 23/2924 |
| | | | | 73/293 |
| 3,548,657 A * | 12/1970 | Panerai | ............... | G01F 23/2927 |
| | | | | 73/293 |
| 3,995,169 A * | 11/1976 | Oddon | ............... | G01F 23/2927 |
| | | | | 385/12 |
| 4,286,464 A * | 9/1981 | Tauber | ............... | G01F 23/2924 |
| | | | | 340/619 |
| 4,287,427 A * | 9/1981 | Scifres | ................. | G01N 21/431 |
| | | | | 250/577 |
| 7,753,545 B2 * | 7/2010 | Groover | ............... | G01F 23/292 |
| | | | | 222/113 |
| 9,920,535 B2 * | 3/2018 | Belman | ................. | E04F 11/002 |
| 10,415,254 B2 * | 9/2019 | Belman | ................. | E04F 11/002 |
| 10,501,941 B2 * | 12/2019 | Belman | ................... | E04F 11/06 |
| 2002/0124643 A1 * | 9/2002 | Robinson | ............ | G01F 23/2924 |
| | | | | 73/290 R |
| 2018/0087420 A1 * | 3/2018 | Poster | ................. | F16H 57/0449 |
| 2018/0087656 A1 * | 3/2018 | Poster | ................. | F16H 57/0449 |

(Continued)

*Primary Examiner* — Michael A Riegelman
(74) *Attorney, Agent, or Firm* — Akona IP PC

(57) ABSTRACT

An aircraft is described and includes an aircraft body, a gearbox housing containing a lubricant, and a remote gearbox lubricant level gauging (RGLLG) system including a light source that when activated illuminates an interior of the gearbox housing; at least one light tube for transmitting light from inside the gearbox housing to an observer end of the RGLLG system, and at least one indicator at the observer end of for indicating a level of the lubricant contained within the gearbox based on the light transmitted via the at least one light tube.

15 Claims, 11 Drawing Sheets

(56)      References Cited

U.S. PATENT DOCUMENTS

2019/0219149 A1*   7/2019   Olson   ................... B64D 35/00
2020/0182679 A1*   6/2020   Olson   ................... B64C 27/14
2023/0375391 A1*   11/2023   Bernklau   ........... G01F 23/2927

* cited by examiner

REMOTE GEARBOX LUBRICANT LEVEL GAUGE SYSTEM FOR ROTORCRAFT

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to the field of aircraft and, more particularly, though not exclusively, to a remote gearbox lubricant level gauge system for aircraft, particularly rotorcraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
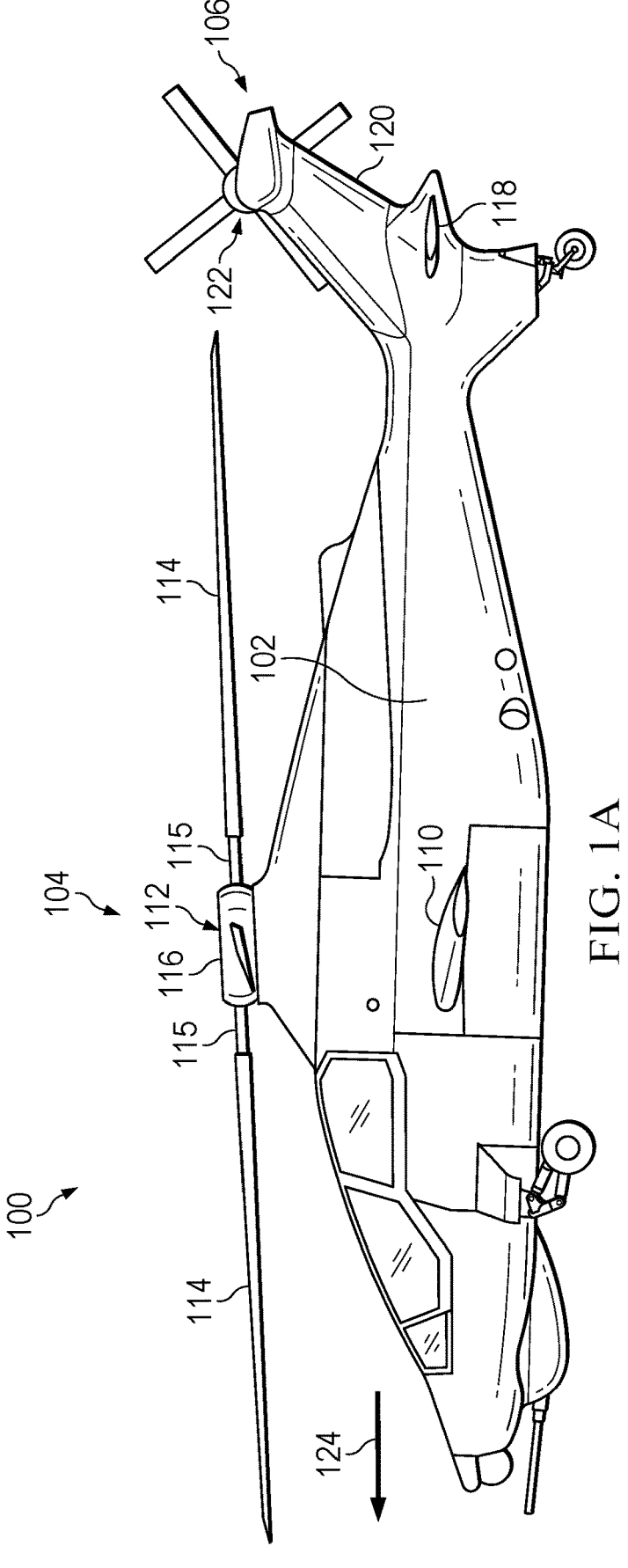
FIGS. 1A and 1B illustrate an example rotorcraft in accordance with features of embodiments described herein.

Rotary-wing aircraft, or rotorcraft, are often required to serve a variety of functions. For example, in some instances, rotorcraft may be required to lift heavy objects and either hover in place or move at a relatively low rate of speed. In other instances, rotorcraft may be required to move at a relatively high rate of speed, particularly when they are not lifting an object or otherwise engaged in stationary flight operations.

One example of a rotary-wing aircraft that may be called upon to perform multiple functions is a military helicopter, such as an attack helicopter. An attack helicopter may be required at times to hover while loitering over a battlefield or providing close air support, and at other times may be required to move at a relatively high rate of speed to respond to a call for close air support.

Prior to flight operations, it is necessary to perform a variety of maintenance checks including, for example, pre-flight gearbox lubricant level checks. Such checks are typically performed using sight gauges located proximate the gearbox sumps. Gearbox sumps, and associated sight gauges, may be located several feet above the ground and correspondingly far above the head of a maintenance technician. As a result, reading such gauges requires that a maintenance technician be able to reach the gauge, for example, by scaling the structure of the aircraft itself or by use of a platform to raise the height of the technician. Even once a technician has access to a gauge, poor sight angles, shadows, and dirty face plates my hinder sight gauge visibility.

In accordance with features of embodiments described hereinbelow, a remote gearbox lubricant level gauge (RGLLG) system for a rotorcraft gearbox deploys a light source within the gearbox to illuminate a lubricant sump of the gearbox when the light source is activated. A number of (e.g., three) "light pipes," which may be implemented using large diameter optical fiber strands, solid transparent rods for transmitting light, or combinations thereof, for example, are provided between the gearbox and an observation panel provided in a convenient location on the body of the rotorcraft. In operation, a maintenance technician presses a button on the observation panel to activate the light source, causing photons to be transmitted by the light pipes from the gearbox to the observation panel. As will be described in greater detail below, the light pipes are arranged such that a first indicator on the observation panel indicates whether the light source is operational and activated, while two additional indicators on the observation panel indicate a lubricant (e.g., oil) level (e.g., "Full" and "Add Lubricant").

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached figures.

Figure 1B:
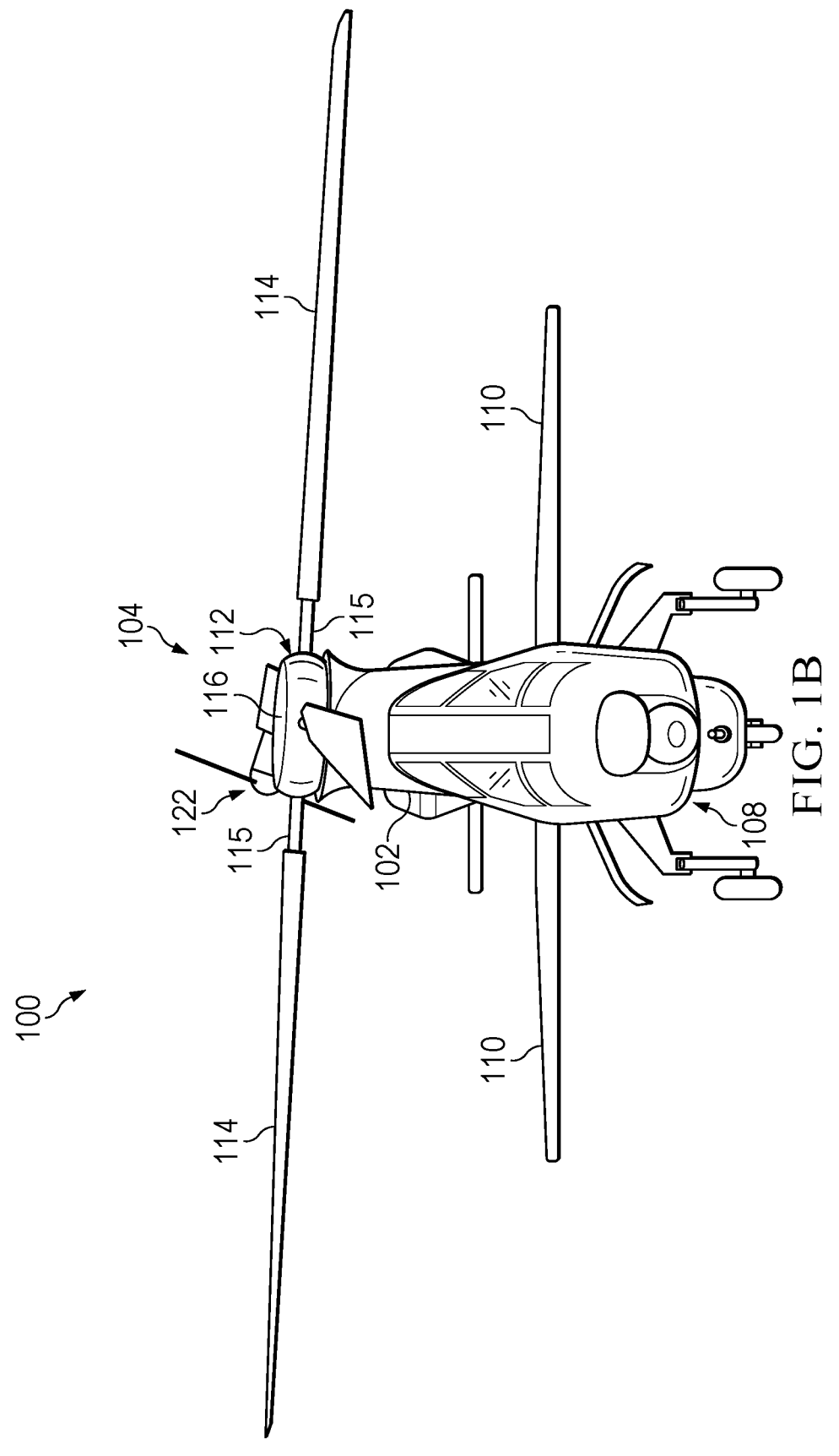

FIGS. 1A and 1B respectively illustrate a side view and a front view of an example aircraft, which in the illustrated example is a rotorcraft 100. As shown in FIGS. 1A and 1B, rotorcraft 100 includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of particular embodiments, the fuselage 102 can also include a payload bay covered by a payload bay door 108 disposed under a wing 110, which in some embodiments includes a support structure and actuation mechanism for extending externally stowed payload (e.g., weapons) outboard away from the fuselage 102 to a firing position. It will be recognized that, although not shown in the view illustrated in FIG. 1A, the opposite side of the rotorcraft 100 also includes a wing and a payload bay door corresponding to the wing 110 and payload bay door 108.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) of the rotorcraft causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades," "yoke/blades," "hub/yoke/blades," and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Figure 2:
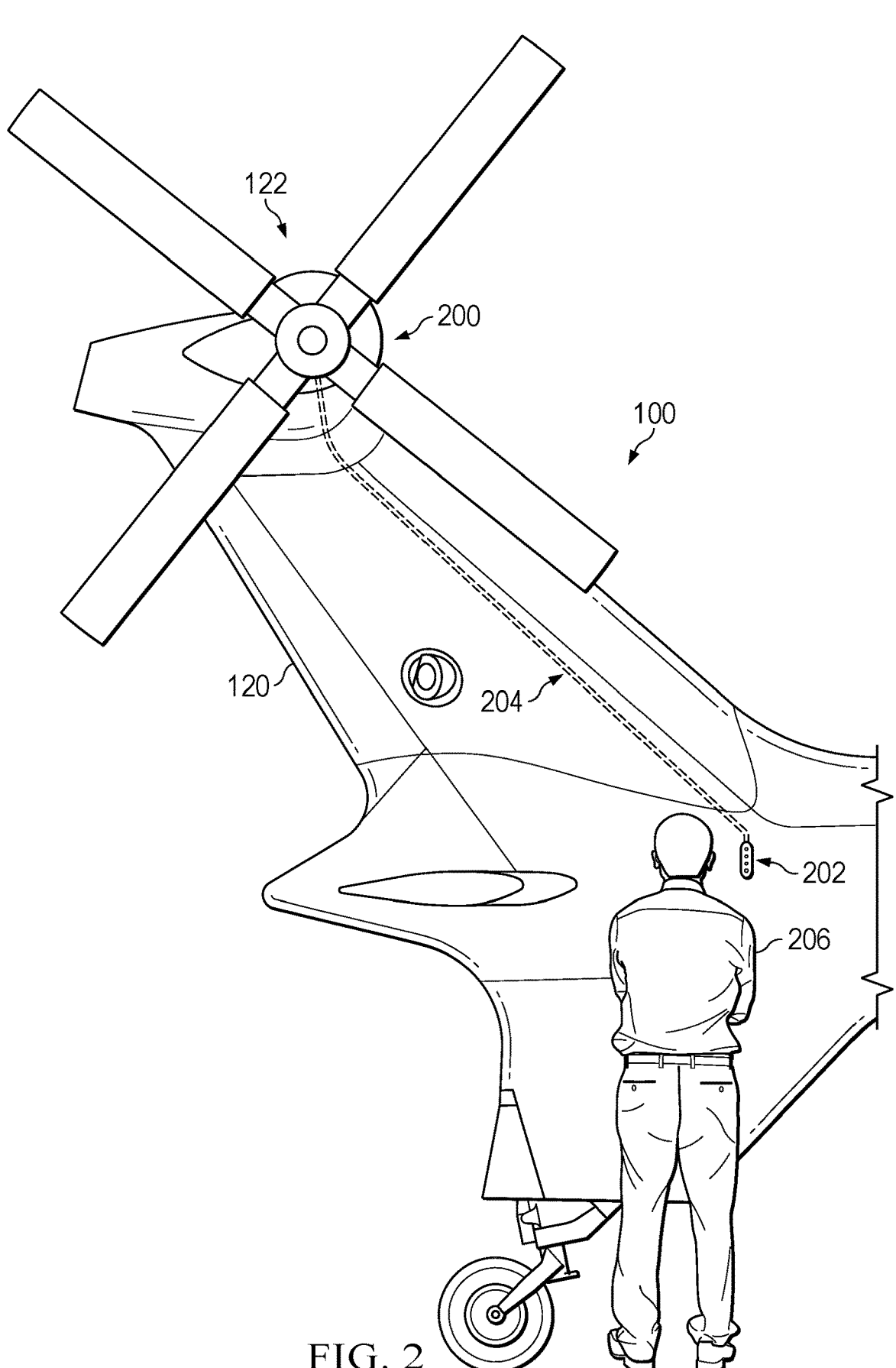
FIG. 2 illustrates a portion of the rotorcraft of FIGS. 1A and 1B showing details of a remote gearbox lubricant level gauge system in accordance with features of embodiments described herein.

FIG. 2 illustrates an aft end of rotorcraft 100 showing additional details of an RGLLG system of particular embodiments. As shown in FIG. 2, the RGLLG system includes a gearbox end 200 connected to an observer end 202 via a plurality of light pipes 204. As used herein, a light pipe comprises a flexible elongated transparent medium capable of transmitting light along the length thereof. For example, an optical fiber or a solid transparent rod may function as a light pipe for purposes described herein.

As will be described in greater detail below, an observer 206, who in particular embodiments may be a rotorcraft maintenance technician, may interact with elements of the observer end of the RGLLG system to determine whether the lubricant level of a gearbox of the gearbox end 200 is sufficient. As illustrated in FIG. 2, the gearbox end 200 is located proximate the anti-torque system 122, which is located a significant distance above the head of the observer 206. The RGLLG system enables the observer 206 to check the lubricant level of the gearbox end 200 gearbox without having to use external means to elevate the observer.

Figure 3:
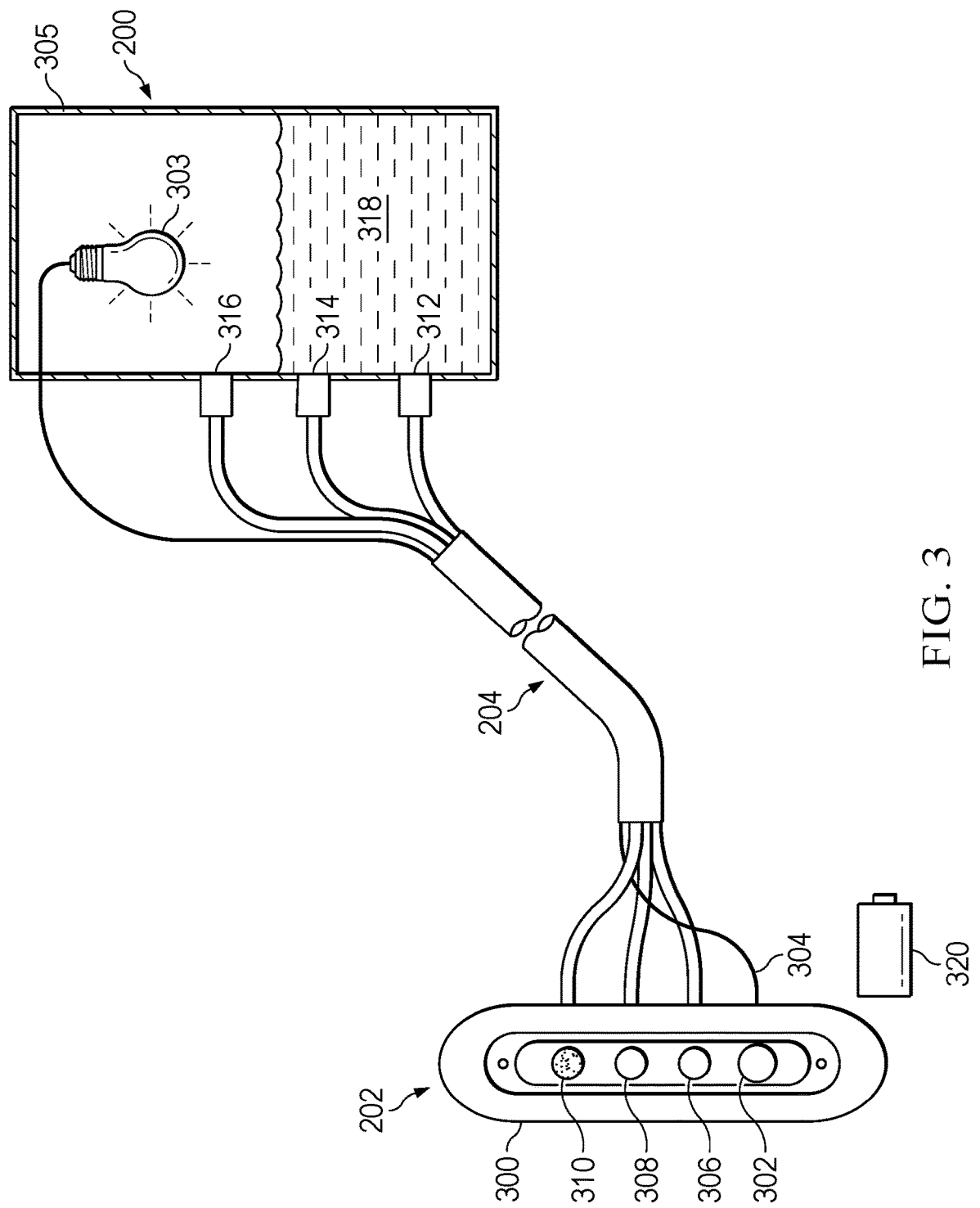
FIG. 3 illustrates additional details of the remote gearbox lubricant level gauge system of FIG. 2 in accordance with features of embodiments described herein.

FIG. 3 is a more detailed illustration of the RGLLG system, which as previously noted includes the gearbox end 200 and the observer end 202 interconnected via light pipes 204. As shown in FIG. 3, the observer end 202 includes an observation panel 300 including a light activation button 302, which is connected to a light source 303 via a wire 304 for providing energy to the light source. Light source 303 is disposed within gearbox housing 305. In operation, pressing the activation button 302 activates the light source 303 thereby illuminating the interior of the gearbox housing 305.

Observation panel 300 further includes indicators, represented in FIG. 3 by three indicators 306, 308, 310. Indicators 306, 308, 310, are connected to respective ports 312, 314, 316, provided in gearbox housing 305 via respective ones of light pipes 204. In particular, indicator 306 is connected to port 312, indicator 308 is connected to port 314, and indicator 310 is connected to port 316. Oil or another lubricant, designated in FIG. 3 by a reference numeral 318, is provided within gearbox housing 305. In operation, once the light source 303 is powered on by pressing the activation button 302, the interior of the gearbox housing 305 is illuminated. Depending on the level of the oil 318 within the gearbox housing 305, zero to all of the light pipes 204 may carry photons from the ports 312-316 to observation panel 300 to light the respective indicator(s) 306-310. The combination of indicators that are illuminated indicates the level of oil 318 in the gearbox housing 305. For example, in the illustrated embodiment, in which the oil level is between the ports 316 and 314, only the indicator 310 will be illuminated, which may indicate that the oil level is too high. In contrast, if the oil level is between the ports 314 and 312, both the indicators 310 and 308 will be illuminated, which may indicate that the oil level is full and no adjustment is needed. Still further, if the oil level is below port 312, all three of the indicators 306-310 will be illuminated, which may indicate that oil needs to be added to the gearbox housing 305. It will be recognized that in particular embodiments, observation panel may include circuitry to cause only one light to be illuminated at a time to indicate the corresponding oil level based on photons received via the light pipes 204.

It will be recognized that, while three indicators and corresponding light pipes are shown and described with reference to FIG. 3, more or fewer indicators and corresponding light pipes may be included depending on the desired implementation.

In particular embodiments, a power source 320 is provided for powering the light source 303. The power source 320 may be located on or off the aircraft 100 in any location and in some embodiments, may be integrated into the observation panels 300. In an alternative embodiment, the light source 303 may be located external to gearbox housing 305 and light from the light source may be conveyed into to the gearbox housing via an additional dedicated light pipe, similar to the light pipes 204.

Figure 4:
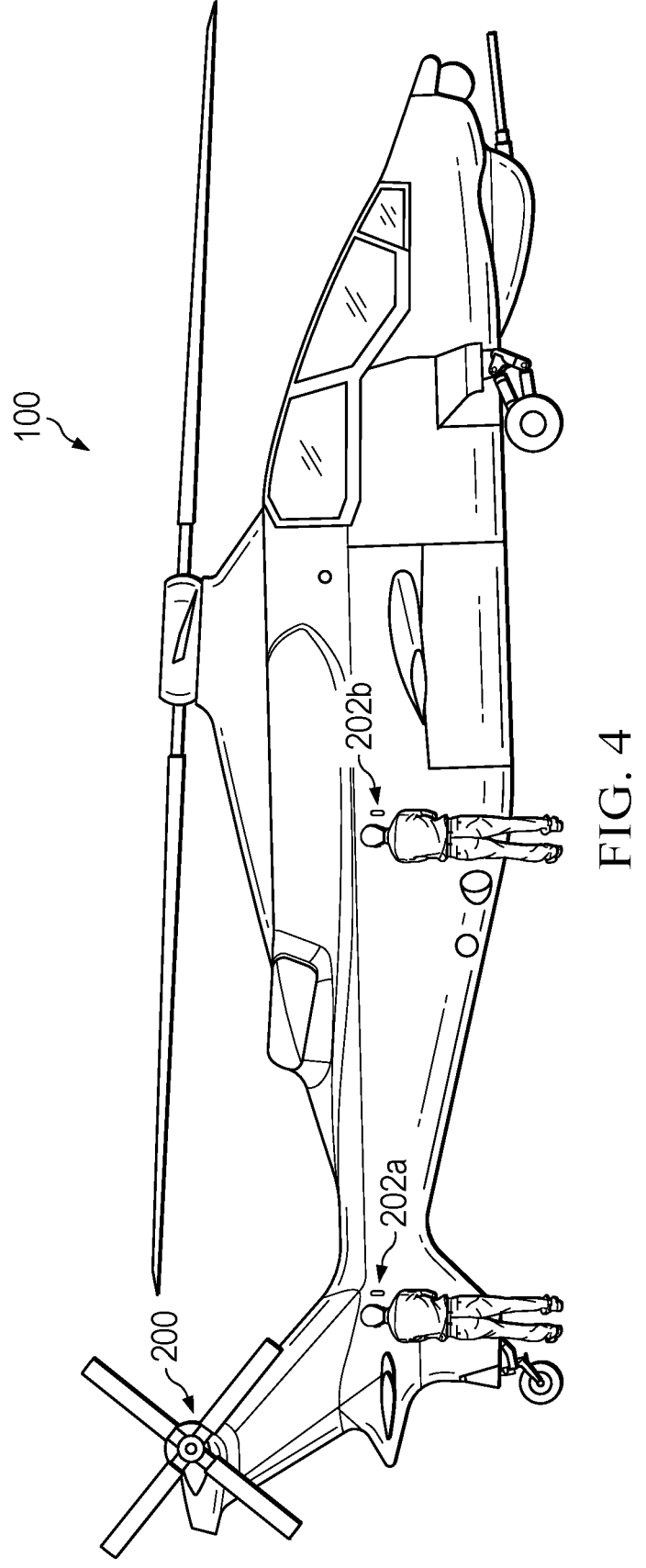
FIG. 4 illustrates the example rotorcraft of FIGS. 1A-1B including an alternative configuration of a remote gearbox lubricant level gauge system in accordance with features of embodiments described herein.

As illustrated in FIG. 4, multiple observation panels FIG. 4 illustrates an alternative embodiment of an RGLLG system that includes multiple observer ends 202a, 202b, may be provided on the body of aircraft 100 and connected via light pipes (not shown in FIG. 4) to gearbox end 200 for enabling gearbox oil level to be observed from multiple convenient locations on the aircraft 100. It will be recognized that while two observer ends 202a, 202b, are illustrated in FIG. 4, more observer ends may be provided and connected to gearbox end 200 or to other gearboxes within the aircraft 100 having oil levels that need to be monitored.

As best illustrated in FIGS. 3 and 4, in accordance with features of embodiments disclosed herein, the observer, or display, panel of the RGLLG may be located on the body of the aircraft at approximately eye level of a person of average height. In particular, the display panel may be positioned on the body of the aircraft at between approximately five to six feet above ground level.

Figure 5:
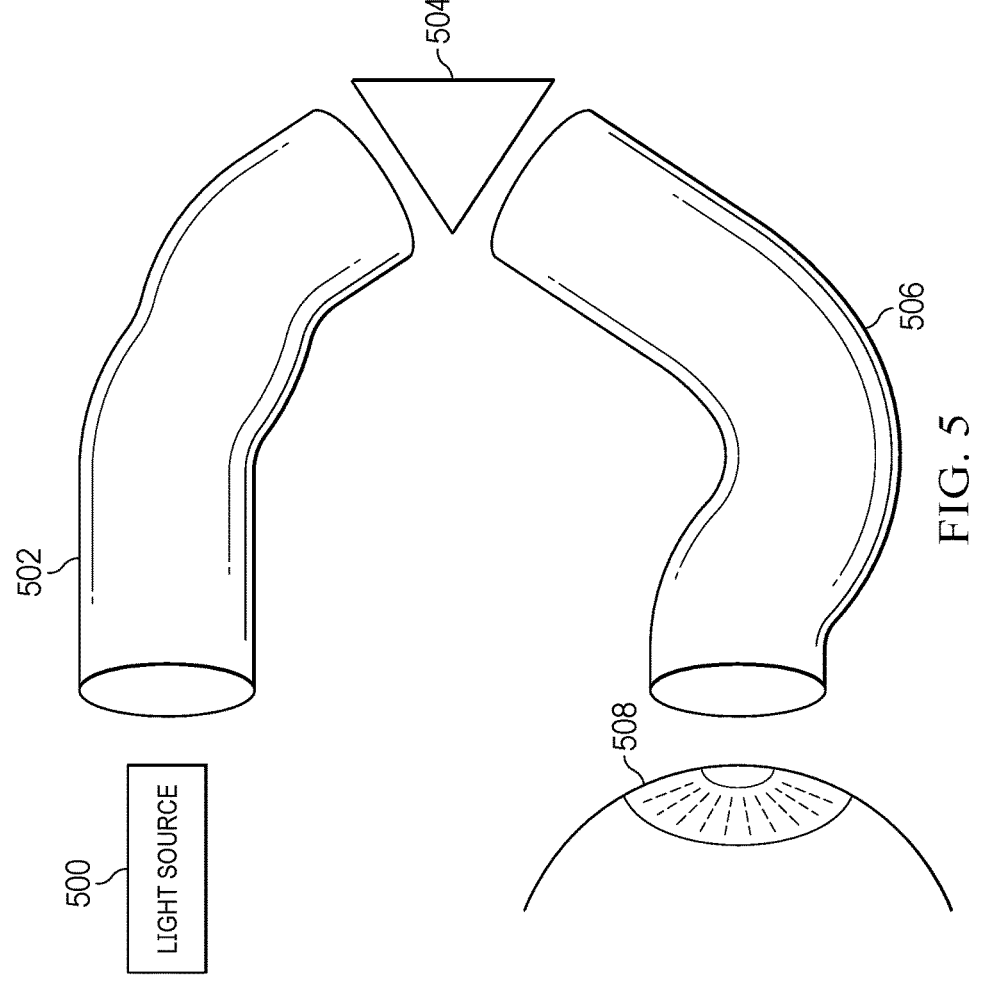
FIGS. 5-9 illustrate a variety of alternative configurations for implementing a remote gearbox lubricant level gauge system in accordance with features of embodiments described herein.

FIGS. 5-9 illustrate details of alternative embodiment of RGLLG systems that may be advantageously implemented to perform the various functions described herein. Referring to FIG. 5, an RGLLG system illustrated therein includes a light source 500 for directing light through a path comprising a light pipe 502, which may be implemented as a fiber bundle (such as a borescope), a fiber array, or discrete fibers, a prism 504 disposed within a gearbox housing (such as gearbox housing 305 (FIG. 3)), and a second light pipe 506 to an observer end 508. Lenses may be disposed at each of light pipes 502, 506 for focusing and dispersing light as appropriate.

In the illustrated embodiment, the prism 504 may have a refractive index n equal to approximately 1.5. Air has a refractive index of n=1, whereas the lubricant disposed within the gearbox housing has a refractive index of approximately n=1.5. It will be recognized that typical lubricants are strongly polar, whereas glass is not, so the lubricant will not tend to cling to the prism 504. When the prism 504 is in the presence of oil, the exiting light path from the source would be at a different angle than when it entered the prism. Light from the source is directed into the prism 504. When oil is not present, the light is reflected at the glass-air interface and passed to the observer through the second light pipe. When oil is present, the light passes through the glass-oil interface and is not visible to the observer. Additional details regarding the system illustrated in FIG. 5 will be described in greater detail below with reference to FIGS. 7A and 7B.

Advantages of the arrangement illustrated in and described with reference to FIG. 5 include that it can easily be integrated into gearbox system and that it provides a high degree of certainty about the observation because the observation is based on the geometric relationships and material properties of the components involved.

Figure 6:
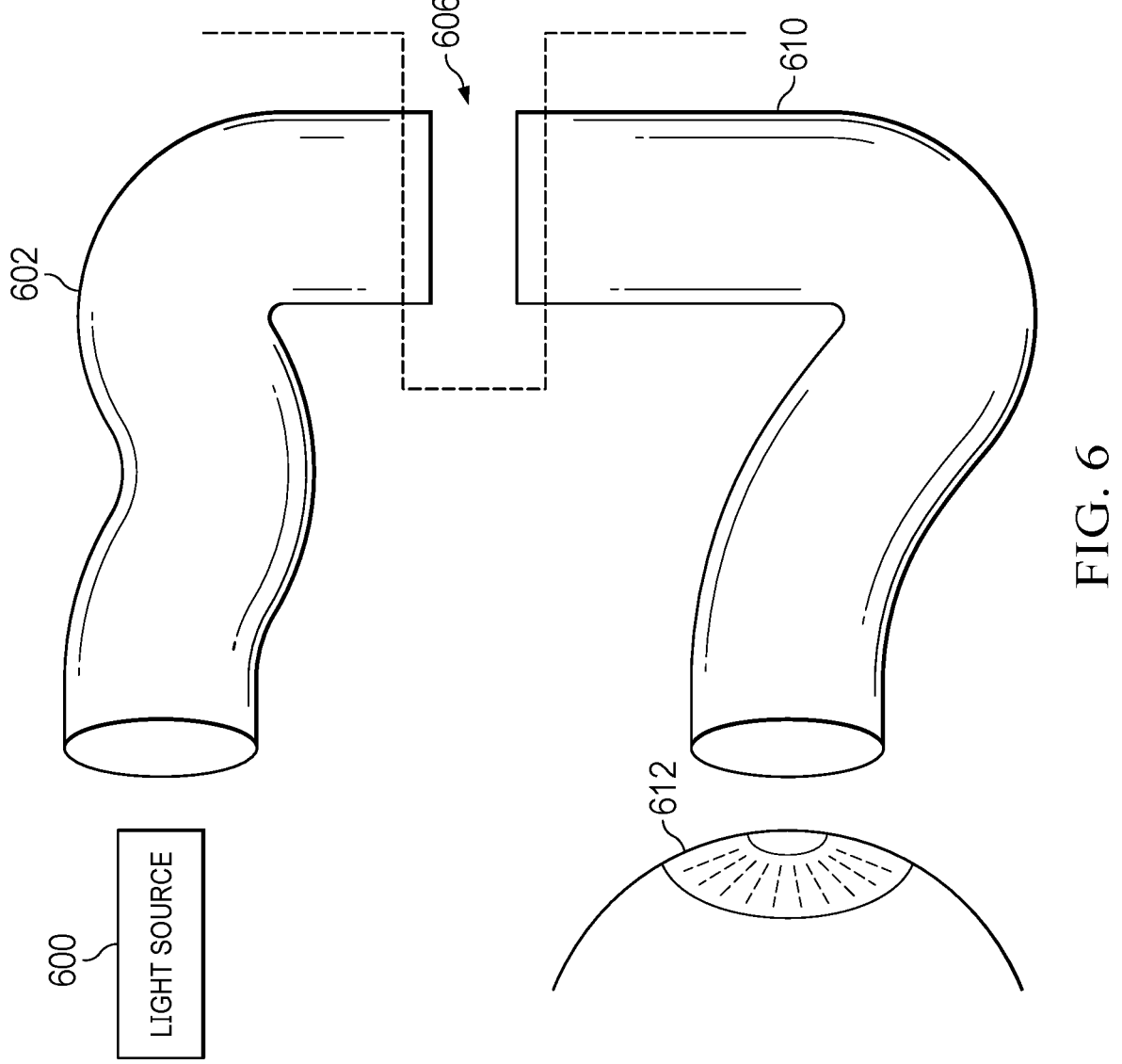

Referring now to FIG. 6, an RGLLG system illustrated therein includes a light source 600 for directing light through a path comprising a light pipe 602, which may be implemented as a fiber bundle (such as a borescope), a fiber array, or discrete fibers, a gap 606 disposed within a gearbox housing (such as gearbox housing 305 (FIG. 3)), and a second light pipe 610 to an observer end 612. Lenses may be disposed at each of light pipes 602, 610 for focusing and dispersing light as appropriate.

As illustrated in FIG. 6, the gap 606 is disposed between ends of the light pipes 602, 610, internal to the gearbox housing and may be implemented using a glass or similar structure for imposing and defining the gap. In the embodiment illustrated in FIG. 6, the gap 606 functions in a manner similar to the prism 504 (FIG. 5), providing a simpler solution for particular embodiments. In contrast to the system illustrated in FIG. 5, however, the system of FIG. 6 may be designed such that transmission across the gap 606 occurs when the gap is immersed in lubricant, such that light is transmitted from the light pipe 602 through the light pipe 610 to the observer end 612. In contrast, when the gap 606 is dry, or not immersed in the lubricant, total internal reflection may occur at the first interface such that light from the first light pipe 602 is diverted away from the second light pipe 610 and therefore does not reach the observer end 612.

It will be recognized that the fidelity of the system shown in FIG. 6 may be lower than that shown in FIG. 5, given that if the gap is too small, a change in the light at the observer end 612 may be difficult to impossible to distinguish. This disadvantage may be overcome by making the two oil-air interfaces non-parallel, such that when air is present, the light from the source will be directed away from the observer and corresponding fiber bundle. Additional details regarding the system illustrated in FIG. 6 will be described in greater detail below with reference to FIGS. 7C and 7D.

Figure 7A:
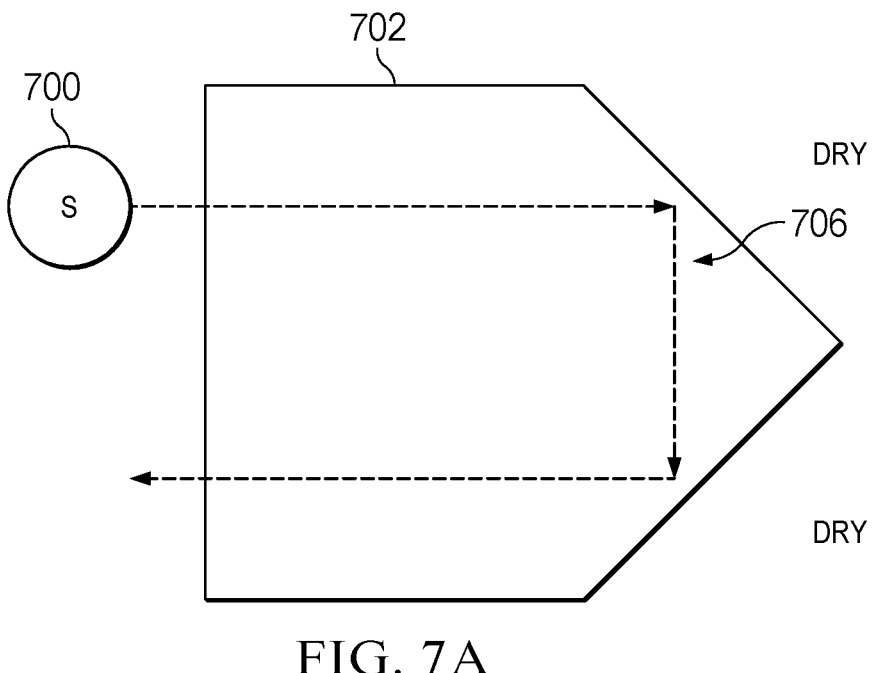
Figure 7B:
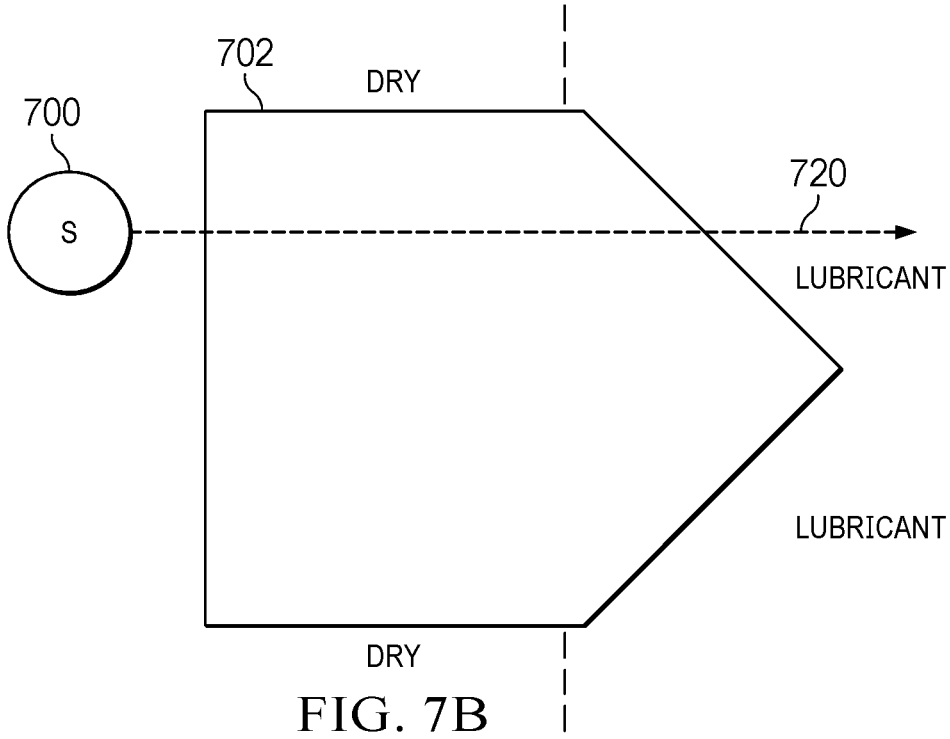

FIGS. 7A and 7B illustrate the path of light from a light source 700 through a prism 702 when the angled faces of prism are dry (FIG. 7A) and when those faces are submerged in a lubricant (FIG. 7B). As shown in FIG. 7A, when the angled faces of the prism 702 are dry, total internal reflection of the light from the light source 700 occurs at angled surfaces of the prism 702 such that the light travels a path 706. In contrast, when the angled faces of the prism 702 are submerged in lubricant, light from the light source 700 exits the prism along a path 720.

Figure 7C:
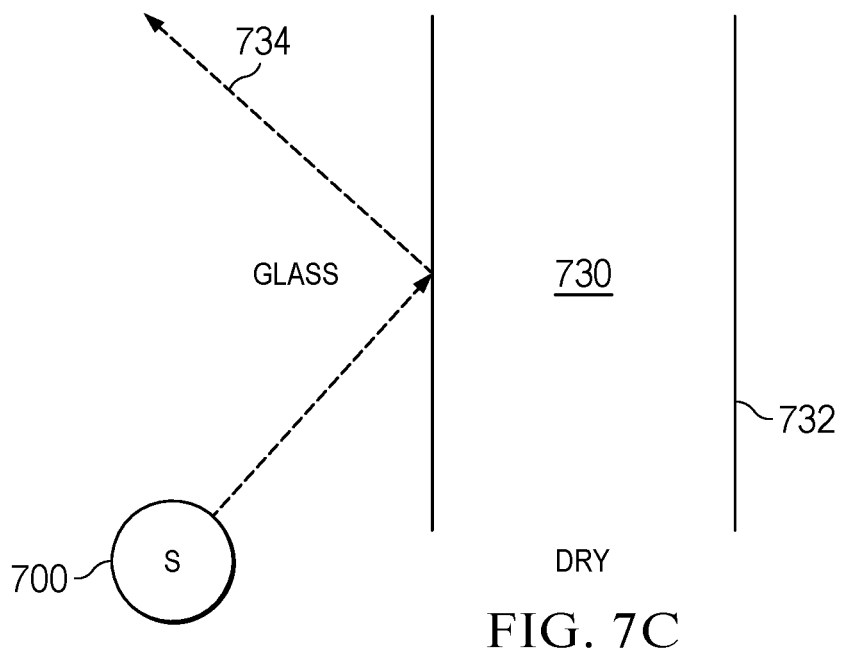
Figure 7D:
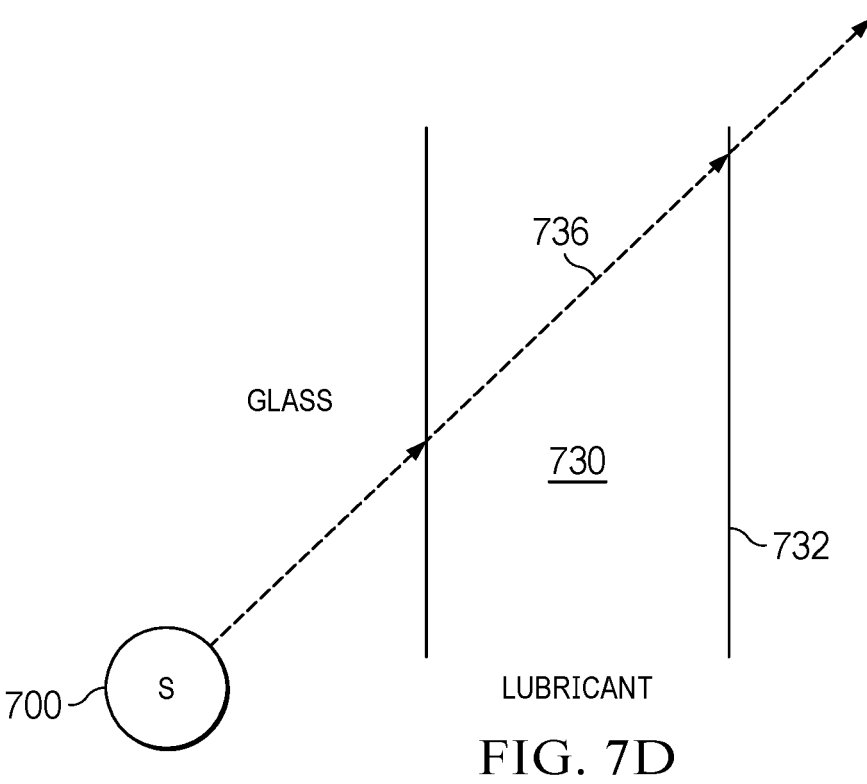

FIGS. 7C and 7D illustrate reflection of light from a light source 700 through a gap 730 when the gap is dry (FIG. 7C) and when the gap is submerged in and/or filled with a lubricant (FIG. 7D. As shown in FIG. 7C, when the gap 730 is dry, total internal reflection of the light from the light source 700 occurs at a first (e.g., glass) surface 732 of the gap such that the light travels a path 734. In contrast, when the gap 730 is submerged in and/or filled with lubricant, light from the light source 700 is transmitted through the gap along a path 736.

Figure 8:
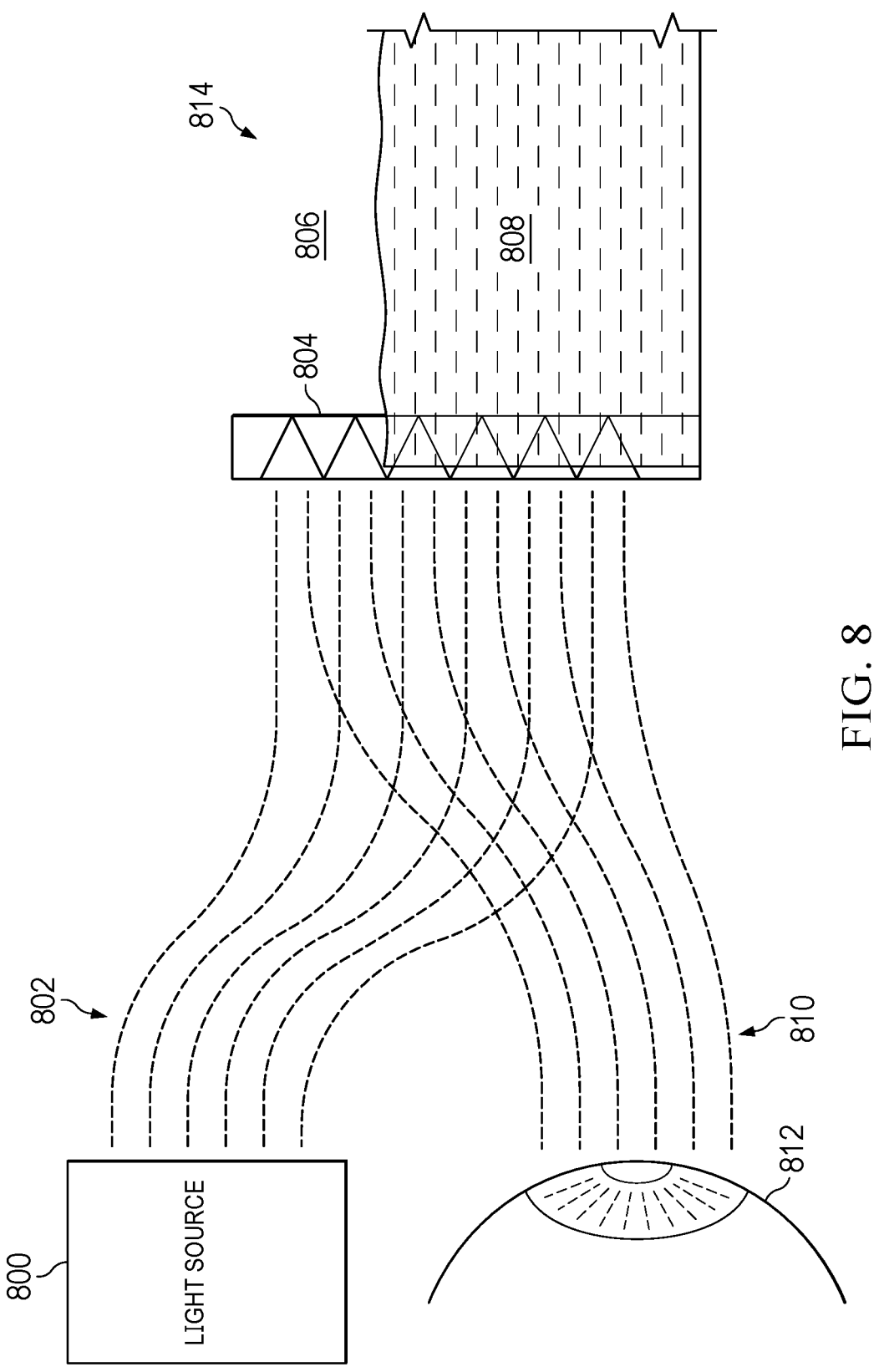

Referring now to FIG. 8, an RGLLG system illustrated therein includes a light source 800 for directing light through a path comprising an optical fiber bundle 802 comprising multiple individual optical fibers, a glass plate 804, and an optical fiber bundle 810 comprising multiple individual optical fibers to an observer end 812. Light from fibers of the bundle 802 directed at the glass 804 at an interface between the glass and air 806 is reflected into corresponding fibers of the bundle 810. In contrast, light from fibers of the bundle 802 directed at the glass plate 804 at an interface between the glass and oil 808 is absorbed such that no light is reflected into corresponding fibers of the bundle 810. The light carried by individual fibers of bundle 810 may be interpreted at the observer end 812 to determine a level of oil in the gearbox housing.

Figure 9:
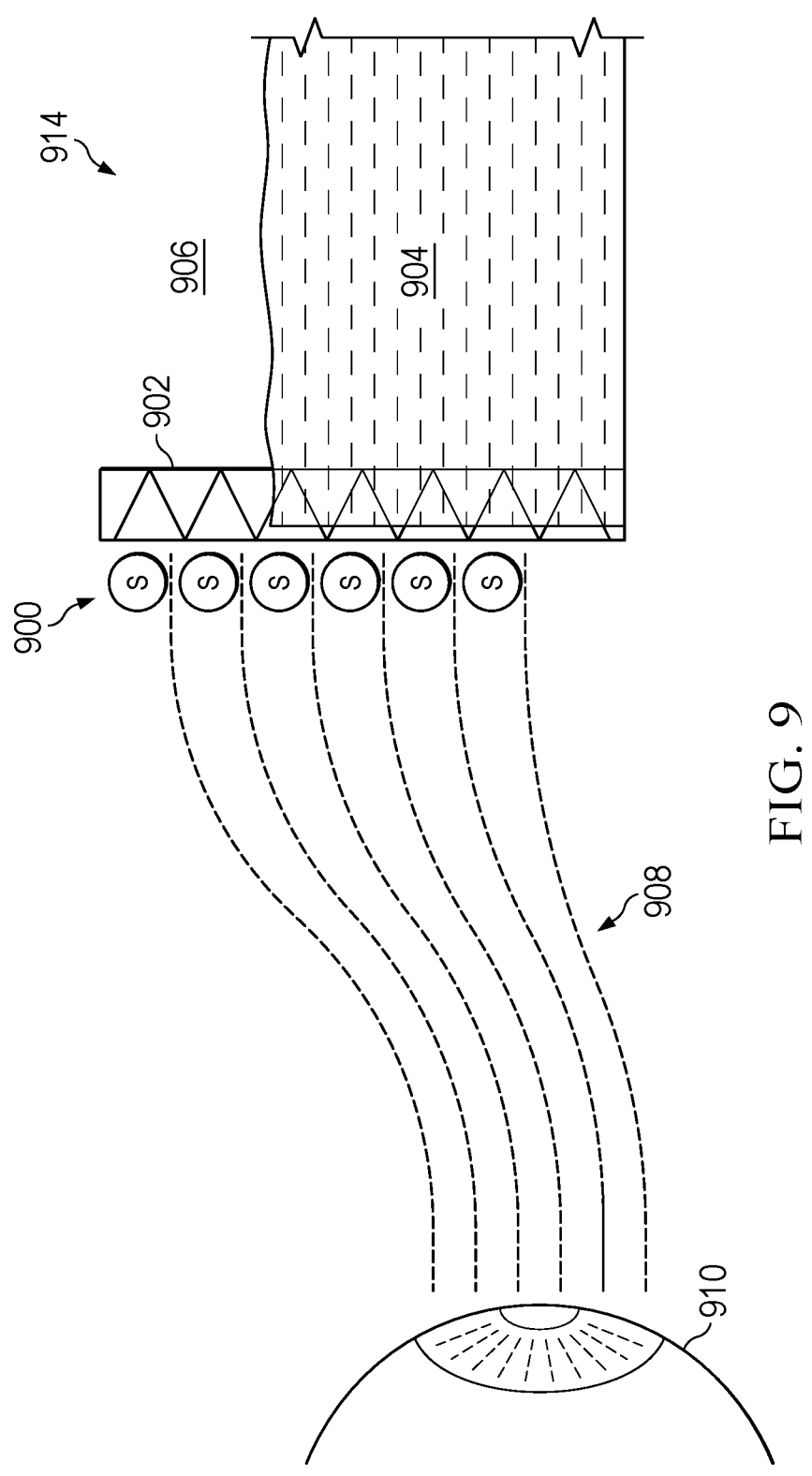

Referring now to FIG. 9, an RGLLG system illustrated therein includes a plurality of light sources 900 each comprising an LED for directing light toward a glass plate 902, and an optical fiber bundle 908 comprising multiple individual optical fibers each corresponding to one of the light sources 900 to an observer end 912. In particular embodiments, the light sources 900 can be shrouded so that they do not reflect off the external face of the glass plate 902 but convey light into the glass plate. Light from light sources 900 directed at the glass plate 902 at an interface between the glass and air 906 is reflected into corresponding fibers of the bundle 908. In contrast, light from light sources 900 directed at the glass 902 at an interface between the glass and oil 904 is absorbed such that no light is reflected into corresponding fibers of the bundle 908. The light carried by individual fibers of bundle 908 may be interpreted at the observer end 910 to determine a level of oil in the gearbox housing. An advantage of the embodiment illustrated in FIG. 9 is that installation does not need to be overly precise to achieve similar optics as other embodiments described herein.

In an alternative embodiment, glass plate 902 may be replaced by a prism with an array of alternating 45-degree faces interfacing with the interior of the gearbox, essentially forming an optical grating, with a planar face on the exterior of the gearbox. External lenses provided at opposite ends of the optical fibers would be provided to focus the light into and out of the fibers, as described above with reference to FIG. 5.

Example 1 provides an aircraft comprising an aircraft body; a gearbox housing containing a lubricant; and a remote gearbox lubricant level gauging (RGLLG) system located on the aircraft body remote from the gearbox housing, the RGLLG system comprising a light source; at least one light tube for transmitting light from within the gearbox housing to an observer end of the RGLLG system; and at least one indicator at the observer end of for indicating a level of the lubricant contained within the gearbox based on the light transmitted via the at least one light tube.

Example 2 provides the aircraft of example 1, wherein the light source is located inside the gearbox housing.

Example 3 provides the aircraft of example 1, wherein the RGLLG system further comprises a switch at the observer end for activating and deactivating the light source.

Example 4 provides the aircraft of example 1, wherein the light source is powered by a power source of the aircraft.

Example 5 provides the aircraft of example 1, wherein the light source is powered by a power source disposed at the observer end of the RGLLG system.

Example 6 provides the aircraft of example 1, wherein the at least one indicator comprises a plurality of indicators for indicating different levels of the lubricant within the gearbox.

Example 7 provides the aircraft of example 1, wherein the RGLLG system comprises multiple observer ends located at various points on the aircraft body.

Example 8 provides the aircraft of example 1, wherein a side of the gearbox comprises a glass plate and wherein light from the light source is directed to the glass plate and light reflected from the glass plate is transmitted by the at least one light tube.

Example 9 provides the aircraft of example 1, wherein a side of the glass plate external to the gearbox comprises a planar surface and a side of the glass plate internal to the gearbox comprises a plurality of an array of alternating 45 degree faces.

Example 10 provides the aircraft of example 1, wherein the RGLLG system comprises a plurality of light tubes and a plurality of indicators and wherein each of the indicators corresponds to one of the plurality of light tubes.

Example 11 provides the aircraft of example 1, wherein the light source comprises a light emitting diode.

Example 12 provides a remote gearbox lubricant level gauging (RGLLG) system comprising a light source that when activated illuminates an interior of a gearbox housing for containing a lubricant; at least one light tube for transporting light from within the gearbox housing to an observer end of the RGLLG system, the observer end comprising a display panel; and at least one indicator on the display panel for indicating a level of the lubricant contained within the gearbox based on the light transported by the at least one light tube.

Example 13 provides a RGLLG system of example 11, wherein the light source is located inside the gearbox housing and the display panel further comprises a switch at the observer end for activating and deactivating the light source.

Example 14 provides a RGLLG system of example 11, wherein the at least one indicator comprises a plurality of indicators on the display panel, wherein each of the indicators corresponds to a different level of lubricant contained within the gearbox.

Example 15 provides a RGLLG system of example 11, further comprising a plurality of display panels disposed at various locations along the aircraft body.

Example 16 provides a RGLLG system of example 11, further comprising a plurality of light tubes extending between the gearbox housing and the observer end, wherein the display panel comprises a plurality of indicators and each of the indicators corresponds to one of the plurality of light tubes.

Example 17 provides a RGLLG system of example 11, wherein the at least one light tube comprises a portion having a first end and a second end and a second portion having a first end proximate the second end of the first portion and a second end proximate the observer end, the RGLLG system further comprising a prism positioned in an area between the second end of the first portion and the first end of the second portion such that light transmitted by the at least one light tube is reflected by the prism into the second light tube when the lubricant is not present in the area and is not reflected by the prism into the second light tube when the lubricant is present in the area.

Example 18 provides a RGLLG system of example 11, wherein the at least one light tube comprises a portion having a first end and a second end and a second portion having a first end proximate the second end of the first portion and a second end proximate the observer end, the RGLLG system further comprising a gap between the second end of the first portion and the first end of the second portion arranged such that light transmitted by the at least one light tube is transmitted through the gap more brightly when the lubricant is present within the gap than when the lubricant is not present within the gap.

Example 19 provides a RGLLG system of example 11, wherein the light source comprises a plurality of light emitting diodes.

Example 20 provides aa method for gauging a level of lubricant contained within a gearbox housing of an aircraft having a body, the method comprising activating a light source; transporting light generated by the light source from an interior of a gearbox housing to a display panel using at least one light tube, wherein the display panel is disposed on the aircraft body at a location remote from the gearbox housing and at approximately a height of a human observer; and illuminating at least one indicator of the display panel based on the light transported using the at least one light tube, the indicator corresponding to a level of lubricant contained within the gearbox housing.

The diagrams in the FIGURES illustrate the architecture, functionality, and operation of possible implementations of various embodiments of the present disclosure. It should also be noted that, in some alternative implementations, the function(s) associated with particular FIGURES may occur out of the order presented. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

What is claimed is:

1. An aircraft comprising:
a fuselage;
a vertical stabilizer connected to an aft end of the fuselage, the vertical stabilizer supporting a tail rotor proximate an upper end of the vertical stabilizer;
a gearbox housing within the vertical stabilizer proximate the upper end thereof, the gearbox housing comprising a top, a bottom, and at least one side disposed between the top and the bottom, the gearbox housing containing a lubricant; and
a remote gearbox lubricant level gauging system comprising:
a light source within the gearbox housing;
a plurality of ports in the at least one side of the gearbox housing;
a display disposed on the fuselage at a location remote from the gearbox housing, the display comprising a plurality of indicators and having integrated therewith a switch for controlling activation of the light source; and
a plurality of light tubes connected between the plurality of ports and the plurality of indicators;
wherein the indicators indicate a level of the lubricant contained within the gearbox housing based on the light transmitted via the light tubes; and
wherein the display comprises multiple displays disposed at various points on the fuselage, wherein each of the displays is remote from the gearbox housing.

2. The aircraft of claim 1, wherein the light source is powered by a power source of the aircraft.

3. The aircraft of claim 1, wherein the light source is powered by a power source located in the fuselage proximate the display.

4. The aircraft of claim 1, wherein a side of the gearbox housing comprises a glass plate and wherein light from the light source is directed to the glass plate and light reflected from the glass plate is transmitted by the at least one light tube.

5. The aircraft of claim 4, wherein a side of the glass plate external to the gearbox housing comprises a planar surface and a side of the glass plate internal to the gearbox housing comprises a plurality of an array of alternating 45 degree faces.

6. The aircraft of claim 1, wherein each of the plurality of light tubes is connected to a respective one of the plurality of ports and wherein each of the indicators corresponds to one of the plurality of light tubes.

7. The aircraft of claim 1, wherein the light source comprises a light emitting diode.

8. A remote gearbox lubricant level gauging system for a rotorcraft, the rotorcraft comprising a fuselage and a vertical stabilizer connected to an aft end of the fuselage, the vertical stabilizer supporting a tail rotor assembly proximate an upper end thereof, the remote gearbox lubricant level gauging system comprising:
a light source that when activated illuminates an interior of a gearbox housing for containing a lubricant, the gearbox housing comprising a top, a bottom, and at least one side disposed between the top and the bottom, the gearbox housing disposed within the tail rotor assembly proximate the upper end of the vertical stabilizer;
at least one port provided in the at least one side of the gearbox housing;
at least one light tube connected to the gearbox housing via the at least one port and configured for transporting light from within the gearbox housing to an observer end of the remote gearbox lubricant level gauging system, the observer end comprising a display panel and located on the fuselage in a location remote from the gearbox housing;
at least one indicator on the display panel for indicating a level of the lubricant contained within the gearbox housing based on the light transported by the at least one light tube; and
a switch for activating and deactivating the light source disposed on the fuselage proximate the display panel; and
a plurality of display panels disposed at various locations on the fuselage and remote from the gearbox housing.

9. The remote gearbox lubricant level gauging system of claim 8, wherein the light source is located inside the gearbox housing.

10. The remote gearbox lubricant level gauging system of claim 8, wherein the at least one indicator comprises a plurality of indicators on the display panel, wherein each of the indicators corresponds to a different level of lubricant contained within the gearbox housing.

11. The remote gearbox lubricant level gauging system of claim 8, further comprising a plurality of light tubes extending between the gearbox housing and the observer end, wherein the display panel comprises a plurality of indicators and each of the indicators corresponds to one of the plurality of light tubes.

12. The remote gearbox lubricant level gauging system of claim 8, wherein the at least one light tube comprises a portion having a first end and a second end and a second portion having a first end proximate the second end of the first portion and a second end proximate the observer end, the RGLLG system further comprising a prism positioned in an area between the second end of the first portion and the first end of the second portion such that light transmitted by the at least one light tube is reflected by the prism into the second light tube when the lubricant is not present in the area and is not reflected by the prism into the second light tube when the lubricant is present in the area.

13. The remote gearbox lubricant level gauging system of claim 8, wherein the at least one light tube comprises a portion having a first end and a second end and a second portion having a first end proximate the second end of the first portion and a second end proximate the observer end, the RGLLG system further comprising a gap between the second end of the first portion and the first end of the second portion arranged such that light transmitted by the at least one light tube is transmitted through the gap more brightly when the lubricant is present within the gap than when the lubricant is not present within the gap.

14. The remote gearbox lubricant level gauging system of claim 8, wherein the light source comprises a plurality of light emitting diodes.

15. A method for gauging a level of lubricant contained within a gearbox housing of an aircraft comprising a fuselage and a vertical stabilizer for supporting a tail rotor assembly including the gearbox housing, the gearbox housing comprising a top, a bottom, and at least one side disposed between the top and the bottom, the method comprising:

activating a light source within the gearbox housing using a switch;

transporting light generated by the light source from an interior of a gearbox housing to a display panel using a plurality of light tubes each connected to one of a plurality of ports disposed in the at least one side of the gearbox housing, wherein the display panel is disposed on the fuselage at a location remote from the gearbox and wherein the switch is incorporated into the display panel; and illuminating at least one of a plurality of indicators arranged on the display panel in a vertical configuration based on the light transported using the plurality of light tubes, the illuminated indicators corresponding to a level of lubricant contained within the gearbox housing; wherein the switch is disposed on the fuselage proximate the display panel wherein the display panel comprises multiple display panels disposed at various points on the fuselage, wherein each of the display panels is remote from the gearbox housing.

* * * * *